United States Patent [19]

Hemmerle et al.

[11] Patent Number: 5,357,450
[45] Date of Patent: Oct. 18, 1994

[54] AUTOMATED MAINTENANCE SYSTEM FOR COMPUTER NUMERICALLY CONTROLLED MACHINES

[75] Inventors: R. David Hemmerle, Blue Ash, Ohio; James E. Randolph, Jr., Wilmington; John G. J. Frezza, Leland, both of N.C.

[73] Assignee: General Electric Company, Cincinnati, Ohio

[21] Appl. No.: 189,862

[22] Filed: Feb. 10, 1994

Related U.S. Application Data

[63] Continuation of Ser. No. 920,069, Jul. 27, 1992, abandoned, which is a continuation-in-part of Ser. No. 800,948, Dec. 2, 1991, abandoned.

[51] Int. Cl.⁵ .............................................. G01B 7/30
[52] U.S. Cl. ..................... 364/551.01; 364/474.18; 364/474.22; 364/474.27; 364/474.34; 364/474.37; 364/571.01
[58] Field of Search ............... 364/474.01, 474.02, 364/474.12, 474.18, 474.22, 474.27, 474.28, 474.34, 474.35, 474.37, 571.01, 571.02, 571.05, 551.01, 559

[56] References Cited

U.S. PATENT DOCUMENTS

| | | | |
|---|---|---|---|
| 3,555,254 | 1/1971 | Gerber | 235/151.11 |
| 3,953,918 | 5/1976 | Bone et al. | 29/568 |
| 3,963,364 | 6/1976 | Lemelson | 408/8 |
| 4,135,239 | 1/1979 | Hamill, III et al. | 364/474.22 |
| 4,190,889 | 2/1980 | Etoh et al. | 364/474.34 |
| 4,260,260 | 4/1981 | Letort et al. | 356/385 |
| 4,281,385 | 7/1981 | Nakaso et al. | 364/474 |
| 4,334,178 | 6/1982 | Lipp | 318/572 |
| 4,382,215 | 5/1983 | Barlow et al. | 364/474.34 |
| 4,403,281 | 9/1983 | Holmes et al. | 364/474.35 |
| 4,428,055 | 1/1984 | Kelley et al. | 364/474 |
| 4,518,257 | 5/1985 | Donaldson | 356/375 |
| 4,542,467 | 9/1985 | McMurtry | 364/474.37 |
| 4,554,495 | 11/1985 | Davis | 318/460 |
| 4,583,159 | 4/1986 | Kanemoto | 364/170 |
| 4,636,960 | 1/1987 | McMurtry | 364/474.37 |
| 4,866,643 | 9/1989 | Dutler | 364/474.37 |
| 4,875,177 | 10/1989 | Jarman | 364/559 |
| 4,887,221 | 12/1989 | Davis et al. | 364/474.02 |
| 4,894,788 | 1/1990 | Stelzer | 364/474.35 |
| 4,899,094 | 2/1990 | Pilborough | 364/474.37 |
| 4,939,678 | 7/1990 | Beckwith, Jr. | 364/571.02 |
| 4,942,611 | 7/1990 | Kunugi et al. | 364/474.34 |
| 4,974,165 | 11/1990 | Locke et al. | 364/474 |
| 5,010,491 | 4/1991 | Biasillo et al. | 364/474.28 |
| 5,031,106 | 7/1991 | Tanahashi et al. | 364/474.34 |
| 5,036,479 | 7/1991 | Prednis et al. | 364/571.02 |
| 5,046,032 | 9/1991 | Alusick et al. | 364/571.02 |
| 5,138,799 | 8/1992 | Buckingham et al. | 51/165 R |
| 5,208,763 | 5/1993 | Hong et al. | 364/474.34 |
| 5,224,052 | 6/1993 | Hamar | 364/474.34 |

FOREIGN PATENT DOCUMENTS

88/02139 3/1988 PCT Int'l Appl. .
91/16673 10/1991 PCT Int'l Appl. .

OTHER PUBLICATIONS

"Wichtige Komponenten zum flexiblen Messen auf Koordinatenmessgeraten", by H. Hahn, Morfelden, wt Zeitschrift für industrielle Fertigung, pp. 539–544 (1984).

Primary Examiner—Kevin J. Teska
Assistant Examiner—Kyle J. Choi
Attorney, Agent, or Firm—Jerome C. Squillaro; Bernard E. Shay

[57] ABSTRACT

The invention provides a system and method for automatically, accurately, and repeatable aligning computer numerically controlled (CNC) movable machine components with respect to their respective degrees of freedom of motion. One embodiment of the invention, particularly useful for maintenance purposes, provides a programmable CNC programmer that uses a spindle mounted probe to measure at least two different positions of a point on a movable machine component to evaluate the geometric condition of the component with respect to a degree of freedom of motion of the component and issue alignment instructions to the machine operator. One embodiment provides the invention in a CNC computer program on a programmable media having a programmed set of instructions. The preferred embodiment uses the controller control the CNC machine's operation and spindle movement, perform the machine components' maintenance evaluation, and issue instructions for aligning the components in a consistent manner.

12 Claims, 6 Drawing Sheets

AUTOMATED MAINTENANCE SYSTEM FOR COMPUTER NUMERICALLY CONTROLLED MACHINES

This application is a continuation of application Ser. No. 07/920,069, filed Jul. 27, 1992 now abandoned which is a continuation in part of our U.S. patent application Ser. No. 07/800,948 filed Dec. 2, 1991, now abandoned.

BACKGROUND OF THE INVENTION

1. Field of the Invention

The invention relates to computer numerically controlled machines and in particular to automated machine component evaluation for use in aligning and maintaining such machines.

2. Description of Related Art

Computer numerically controlled (CNC) machines are used to accurately machine and produce parts in an efficient and repeatable manner. CNC machines typically use compensation techniques to account for linear positional errors, and tool length errors. Methods and apparatuses are conventionally available to manually evaluate a CNC machine's geometric conditions with respect to their various degrees of freedom of motion to determine whether alignment or machine restoration is required. Automatic tool length compensation is also available to evaluate machine rotary tool lengths and compensation lengths for use by CNC machines. These techniques are used for insuring machining accuracy.

Various devices, probes, and systems have been developed for accurately and automatically measuring tool length errors and work piece dimensions. Examples of such systems, using sensor apparatuses commonly referred to as touch trigger probes, are illustrated in U.S. Pat. No. 4,382,215 entitled "System and Method of Precision Machining", by Allan R. Barlow and William A. Hunter, which issued on May 3, 1983; U.S. Pat. No. 4,428,055, entitled "Tool Touch Probe System and Method of Precision Machining", by John R. Zubrick and John R. Kelley, which issued on Jan. 24, 1984; and U.S. Pat. No. 4,899,094 entitled "Method of Calibration for an Automatic Machine Tool" by David I. Pilborough, which issued on Feb. 6, 1990, and is assigned to Renishaw plc in England. These patents provide background information as well as illustrate some of the prior art.

Good machine maintenance involving machine evaluation and restoration is important for accurate and precision machining. Conventional machine maintenance evaluation is labor intensive and dependant. Because of the amount of human intervention required differences occur in the machine's evaluation and restoration. Different technicians may perform the maintenance procedures slightly differently. Environmental differences such as temperature may also effect the alignment of machine components.

Another problem associated with conventional restoration procedures relates to repeatability which is a particular concern for machining operations using statistical analysis to improve quality.

Therefore, there exists a need to accurately evaluate a machine's geometric condition during the machining process without significantly interrupting the flow of work through the machine. There is also a need to evaluate and restore the machine in a quicker more repeatable manner than is conventionally available.

SUMMARY OF THE INVENTION

The present invention provides a system and method for automatically, accurately, and repeatably evaluating a geometric condition of a computer numerically controlled (CNC) machine components with respect to its degrees of freedom of motion and issuing aligning instructions to the machine operator.

The present invention provides a CNC machine having spindle mounted probes to measure relative positions of movable machine components, a computerized control means to direct spindle mounted probes to measure at least two different positions of a movable machine component, and a computing means that uses the measured positions to calculate the geometric condition of the machine component related to a degree of freedom of motion of the component.

The preferred embodiment uses a computer to both control the CNC machine's operation including its spindle movement and perform the calculations associated with the present invention. A computing means is provided for calculating misalignment of the machine's movable component. Alignment means is provided for determining and issuing alignment instructions for the component. The preferred embodiment uses a CNC controller display to display the calculated amount of misalignment and issue alignment instructions.

BRIEF DESCRIPTION OF THE DRAWINGS

The foregoing aspects and other features of the invention are explained in the following description, taken in connection with the accompanying drawing where.

DETAILED DESCRIPTION OF THE INVENTION

Figure 1:
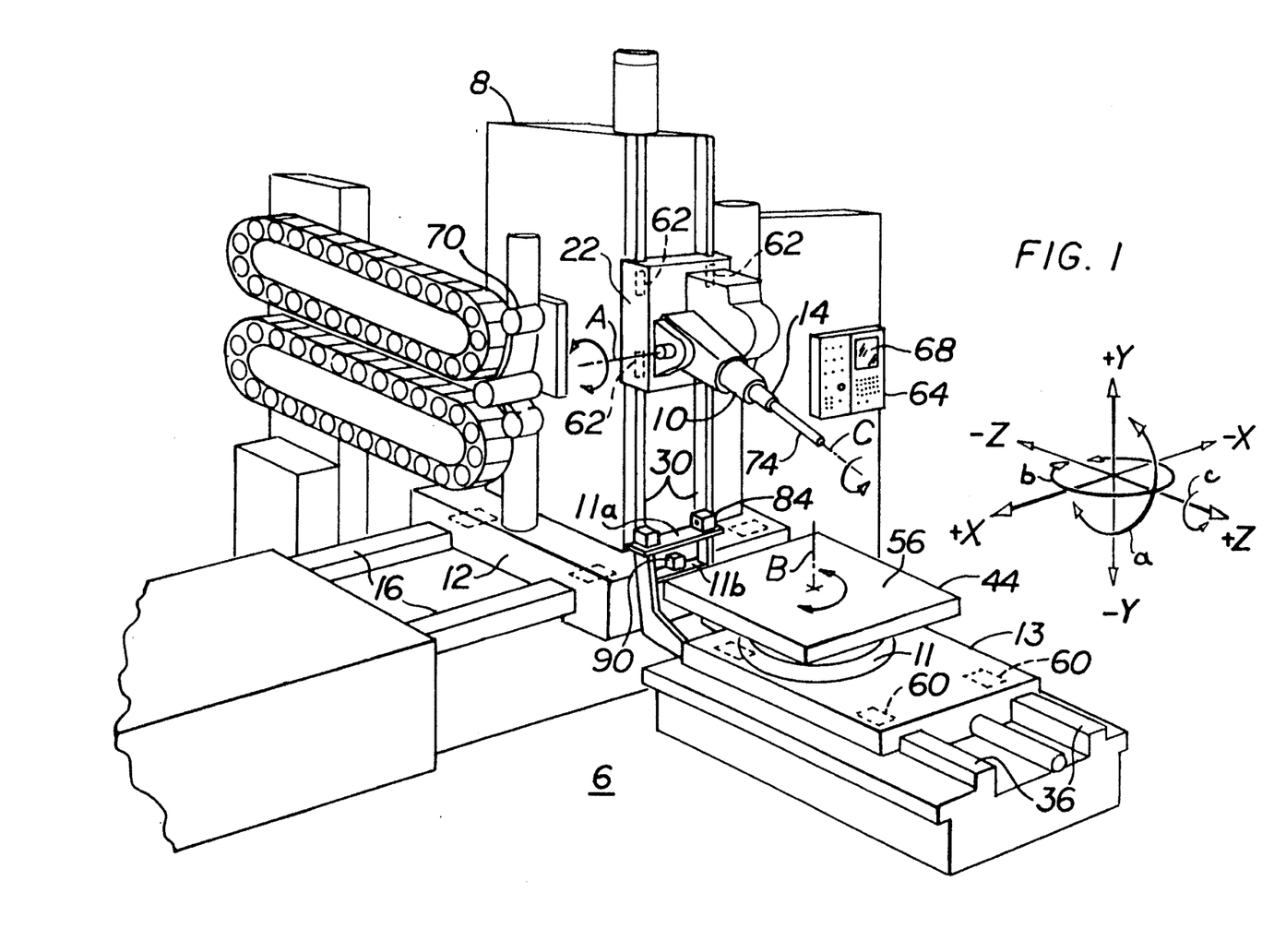
FIG. 1 is a perspective view illustrating a CNC machine including a reference coordinate system in accordance with the preferred embodiment of the present invention.

Illustrated in FIG. 1 is a computer numerically controlled (CNC) machine 6 of the 5 axis multi-purpose milling, drilling, and boring machine type such as the T-30 manufactured by Cincinnati Milacron. CNC machine 6 is generally constructed about a column 8 mounted on a linearly movable machine base 12 slidably resting on horizontal X direction guideways 16 parallel to the X axis. CNC machine 6 functions to position, power, and control a spindle mechanism 10, rotatable about its centerline of rotation C, relative to a positionable work table 11. Powered by the machine's motor (not shown), spindle mechanism 10 includes a tool holder 14 adapted for receiving and retaining various cutting tools, measuring devices, and probes used in the machining process.

CNC machine 6 provides a means to move spindle mechanism 10, while it is spinning a tool mounted in its tool holder 14, relative to a work piece (not shown) mounted at a particular position on a work table 11. Relative positioning between work piece and spinning spindle mechanism 10 is provided along 3 linear motion axis X, Y, and Z and about two rotational axes, trunnion axis A and table axis B as shown in the corresponding reference axis in FIG. 1.

CNC machine 6 has a spindle carrier 22 to which spindle mechanism 10 is trunnioned thereby allowing spindle mechanism 10 to be pivoted about trunnion axis A which is parallel to the X axis. The centerline of rotation C, of spindle mechanism 10, is parallel to the Z axis when trunnion angle a=0°. Spindle carrier 22 is slidably mounted to vertical or Y guideways 30, which in turn are mounted to column 8, to provide motion along the Y axis for spindle mechanism 10.

Horizontal Z direction guideways 36 slideably support work table 11 having a tabletop 44 rotatable about a vertical table axis B which, when properly aligned, is parallel to the Y axis. The present invention in its preferred embodiment is designed to be used without a work piece mounted on a movable pallet (not shown) which is removably mountable to tabletop 44 (which is also referred to as a clamp plate when adapted to secure a movable pallet). The evaluation procedures of the present invention are preferably carried out without the pallet and work piece mounted on machine 6 and are preferably done with the pallet in transit, such as on an automated guide vehicle (also not shown), in order to eliminate or significantly reduce the amount of time machine 6 is not running. The top of clamp plate 44 provides a reference top surface 56 which is rotatable about table axis B.

Work table 11 includes a Z carrier 13 which is provided with a means for adjusting or aligning table axis B by adjusting four sets of z carrier spacers 60 (the location of three shown) upon which work table 11 rests. Another 4 sets of y carrier spacers 62 (the location of three shown), for use in mounting spindle carrier 22 to vertical guideways 30, are used to align trunnion axis A of spindle mechanism 10.

Figure 2:
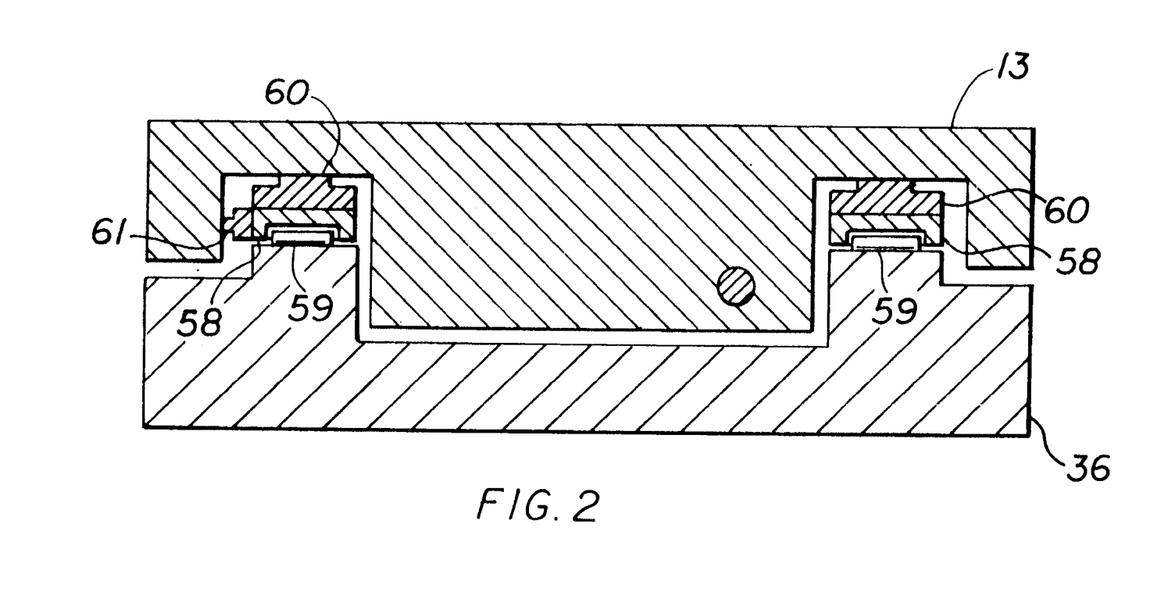
FIG. 2 is a cross-sectional view of a z carrier spacer support system of CNC machine in FIG. 1.
Figure 2A:
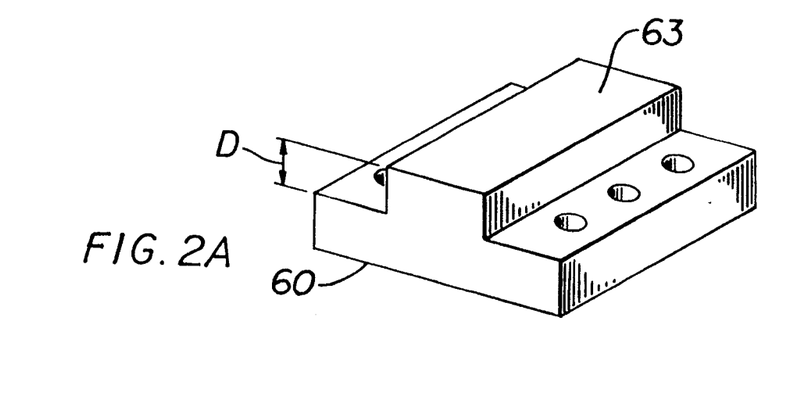
FIG. 2a is a perspective view of an adjustable spacer for z carrier spacer support in FIG. 2.
Figure 3:
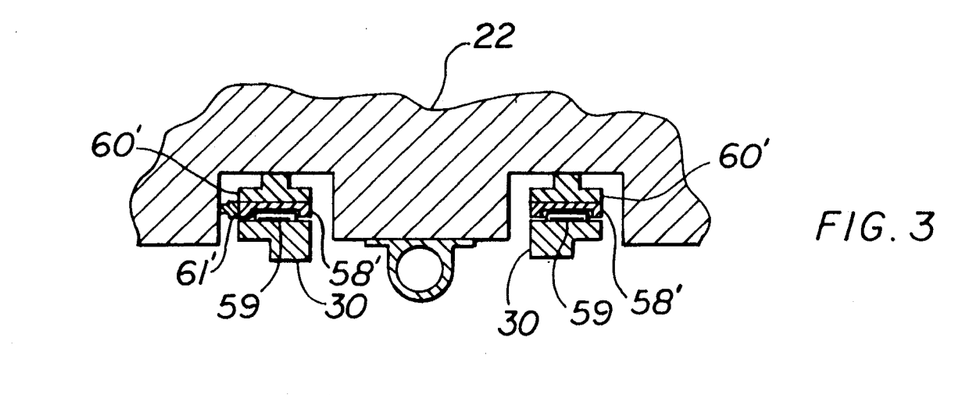
FIG. 3 is a cross-sectional view of a y carrier spacer support system of CNC machine in FIG. 1.

Illustrated in FIG. 2 is a conventional z carrier support spacer 60 supporting z carrier 13 on z guideways 36 and mounted to z roller bearing packs 58 having roller bearings 59. Two z side spacers 61 (one of which is shown) lie essentially along the same z coordinate on z carrier 13 and are also used for component alignment. Carrier support spacer 60 is more particularly illustrated in FIG. 2a as having a grind stock 63 with a height D for grinding in order to adjust the carrier, side spacers are similarly constructed with a grind stock. Similar to z carrier spacer arrangement in FIG. 2 is y carrier spacer arrangement illustrated in FIG. 3 whereby y carrier 22 is supported on guideways 30 by conventional y carrier support spacers 60' which are mounted on y roller bearing packs 58' having roller bearings 59. Two z side spacers 61' (only one shown) lie essentially along the same y coordinate on y carrier 22 and are also used for component alignment.

Figures 4, 4A:
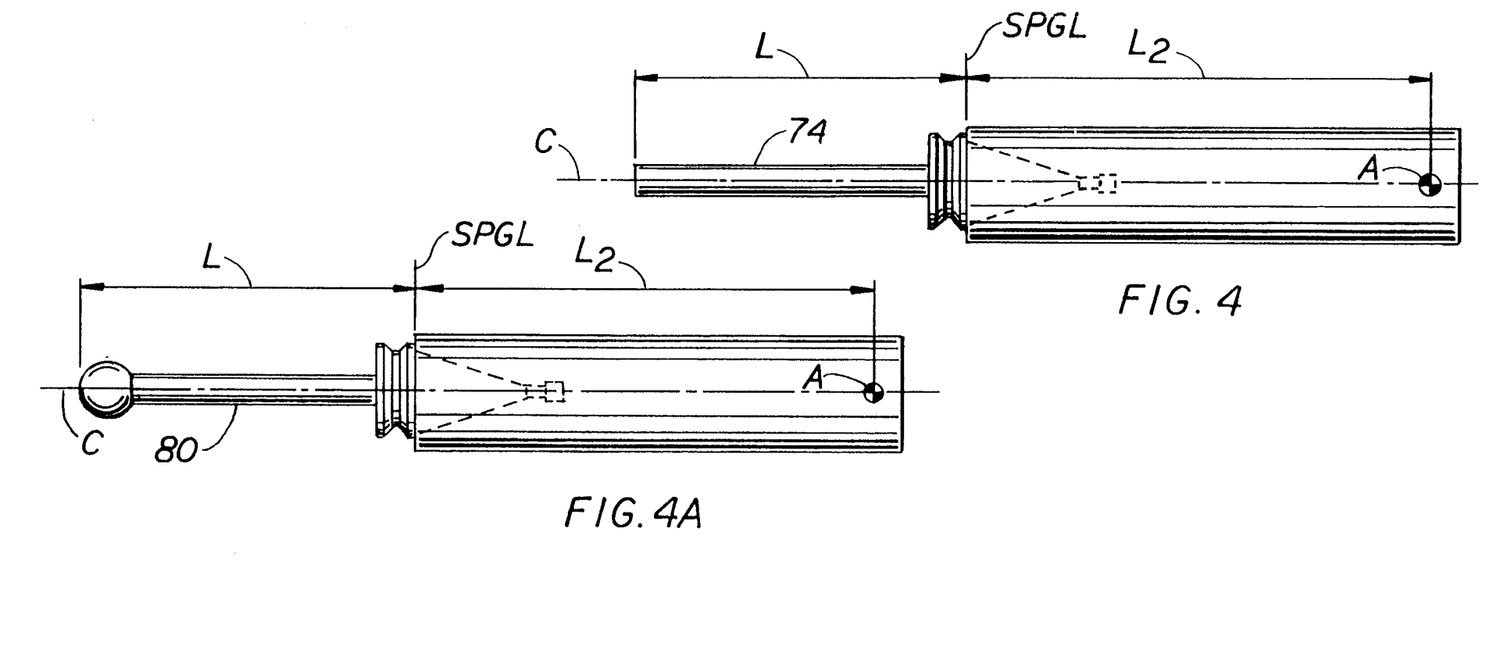
FIG. 4 is a sideways diagrammatic view of a TVG test bar mounted in a spindle mechanism of CNC machine in FIG. 1.
FIG. 4a is a sideways diagrammatic view of a trigger type probe mounted in a spindle mechanism of CNC machine in FIG. 1.

Referring back briefly to FIG. 1, an automatic tool changing mechanism 70 is provided for CNC machine 6, of a type commonly used in the industry, and is adapted to store a TVG test bar (tool verification gauge test bar 74 and trigger probes 80 as illustrated in FIGS. 4 and 4a respectively.

Illustrated in FIG. 4 is a TVG test bar 74 which is a standardized reference having a known diameter and fixed length L to its spindle gauge line SPGL at which point it mates, at a known trunnion length L2 measured from axis A to SPGL, to spindle mechanism 10. FIG. 4a illustrates a conventional trigger type probe 80 such as a Renishaw touch trigger probe, which is also stored in automatic tool changing mechanism 70, for use in making the alignment measurements. Probe 80 is also constructed to mate to spindle mechanism 10 at their common spindle gauge line SPGL.

Referring again to FIG. 1, a beam actuated measuring device 84 is mounted to a platform 11a (extending from Z carrier 13) which has been conventionally used for accurately measuring lengths of tools. Such a beam type device, often referred to as a TVG beam (tool verification gauge beam), is explained in more detail in U.S. Pat. No. 4,518,257 entitled "Optical Inspection System and Method", by Charles Wayne Donaldson, which issued on May 21, 1985, is incorporated herein by reference. Another conventional reference device is a datum cube 90 shown fixedly mounted to a second platform 11b extending from worktable 11 and used in conjunction with probes to evaluate the geometric condition of spindle mechanism 10 with respect to its degrees of freedom of motion.

Control of CNC machine is provided by a computerized controller 64 having a display 68 and generally mounted near or in the vicinity of column 8 and work table 11. Computerized controller 64 is capable of being programmed to machine a work piece and is programmable for making alignment measurements, calculating the amount of misalignment, and displaying the amount of misalignment on display 68. Programs are loaded in a conventional manner using CNC tapes.

Misalignment of a machine component occurs when a geometric condition of the machine's component varies from preplanned, programmed, or restoration values. Though some linear misalignments can be compensated by incorporating offsets by well known techniques in the machining programs, angular misalignments, table axis B for example, conventionally require human measurements and adjustments to properly realign the respective components.

Another feature of the preferred embodiment of the present invention is that controller 64 is programmed with a table or set of alignment instructions for an operator to follow to align a machine component such as work table 11 in order to restore table axis B to its parallel position to reference axis Y if so desired. The logic to evaluate the misalignment and determine whether restoration is desired is also programmed into controller 64 by CNC tape. The schedule of alignment procedures is stored as a function of machine component misalignment measurements which in the preferred embodiment are made by detecting the position in space of a feature on the machine component at two or more different positions.

Several types of machine component evaluations are contemplated by the present invention. Some of these are illustrated herein. Though the illustrations herein are shown for a Cincinnati Milacron T-30 5 axes machine it should be understood that the invention is applicable to any NC machine with similar machine components.

Figure 5:
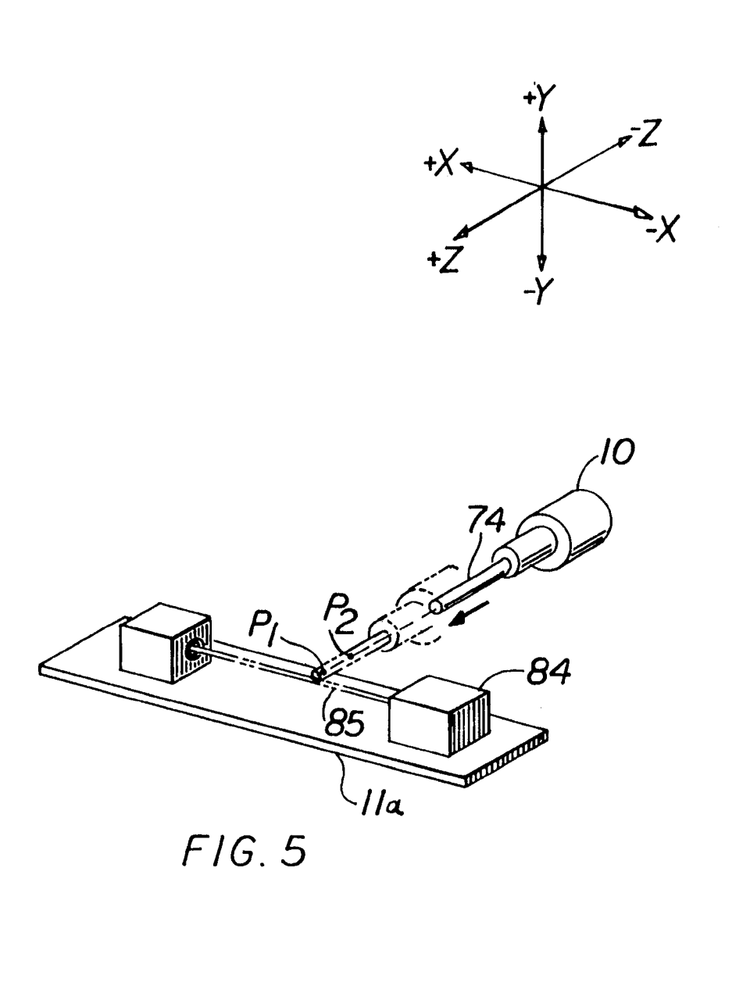
FIG. 5 is a perspective diagrammatic view illustrating a procedure to determine the alignment on geometric condition of the spindle center of rotation using TVG test bar of FIG. 4 in accordance with one embodiment of the present invention.

Illustrated in FIG. 5 is one embodiment of the present invention to evaluate the geometric condition of the angular degree of freedom of motion of the spindle's centerline of rotation C of spindle mechanism 10 in the ZY plane using TVG test bar 74. Spindle mechanism 10, in the horizontal position at an angle a=0°, is moved downward to break an infrared TVG beam 85 of beam actuated measuring device 84 at which point controller 64 then records a first position P1 having a z coordinate Z1 and a y coordinate Y1. Spindle 10 is then extended a distance in the Z direction delta z and the procedure is repeated to determine a second set of coordinates Z2 and Y2 by passing the TVG bar through the TVG beam at a second position P2. TVG beam 85 is then probed by TVG bar 74 and breaks TVG beam 84 at a Y2 coordinate which should be equal to the Y1 coordinate otherwise the spindle's centerline of rotation C of spindle mechanism 10 is not properly aligned and may require alignment.

Figure 6:
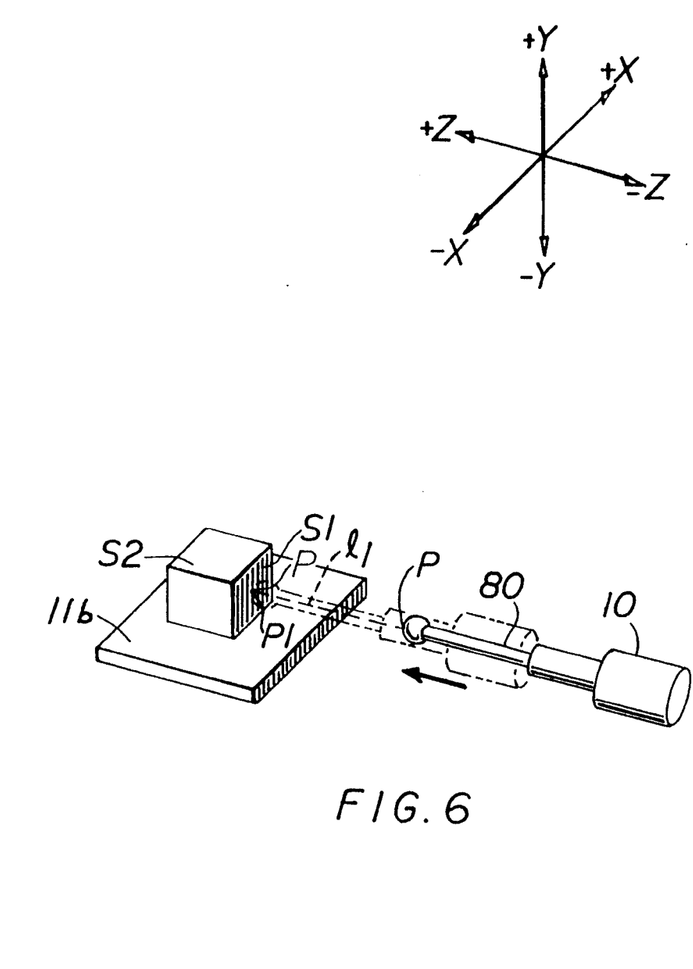
FIG. 6 is a perspective view generally illustrating the probing procedure of the present invention.

FIG. 6 generally illustrates a probing technique using a trigger type probe to illustrate the present invention, a series of computerized machine instructions to machine 6, in FIG. 1, coded on a programmable computer readable media such as a CNC tape. A trigger probe 80 mounted in a spindle mechanism 10 is used to evaluate a position P1 of a contact point P related to a respective geometric condition and a degree of freedom of motion of that component. A probing path to probe first position P1 is indicated by dotted lines 11. This convention will be used in the discussion below. Probing, in three dimensional space, is typically performed in a coordinate direction, such as in the X direction, to determine a corresponding coordinate, such as X0, of a position, such as P0. The other two coordinates, such as Y0 and Z0, are set by the numerical controller of the machine while a probe is used to the strike position, P0, and capture and record the third coordinate, X0.

Figure 7A:
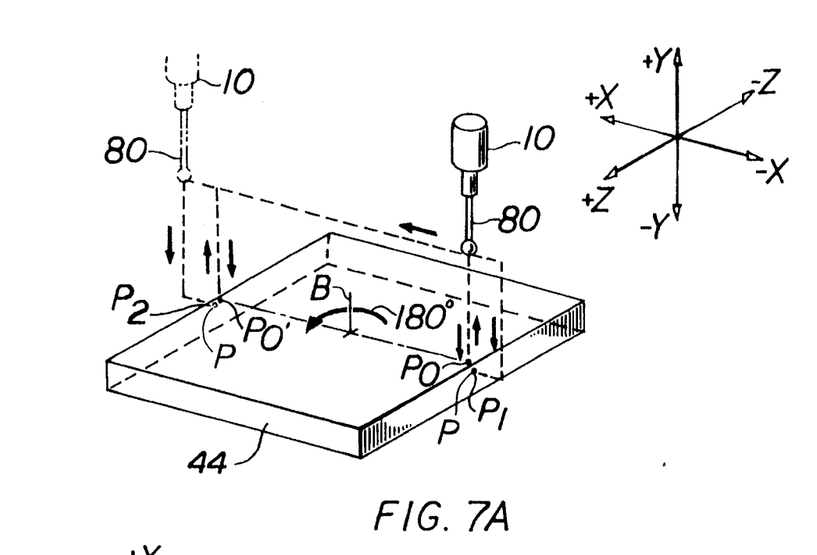
FIG. 7a is a perspective diagrammatic view illustrating a procedure to evaluate the X home position of CNC machine in FIG. 1.
Figure 7B:
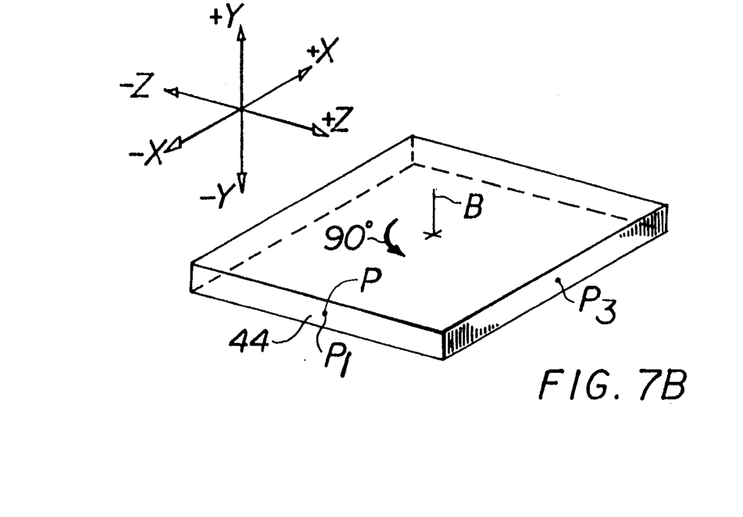
FIG. 7b is a perspective diagrammatic view illustrating a procedure to evaluate the Z home position of CNC machine in FIG. 1.

Evaluation of X and Z axis home positions in accordance with the preferred embodiment of the present invention is illustrated in FIGS. 7a and 7b respectively. Evaluation of home or 0 positions of the X and Z axes of machine 6 may be used for machine restoration and is also useful for calculation and storage in controller 64 of respective offsets used by the machine to accurately position spindle mechanism 10 and a rotary tool point of a tool that would be mounted therein during machining. Trigger probe 80 is used, its first position P1 is probed using a probe path illustrated in dotted line format, and its second position P2 is probed using a probe path illustrated in dashed line format.

Referring to FIG. 7a for the X axis home position evaluation, probe 80 mounted in spindle mechanism 10, at a trunnion angle a=−90° and in line with table axis B, is brought in to touch tabletop 44 near its edge to determine it's height or Y position. The top surface of tabletop 44 is probed with probe 80 at a point having a position P0, near the edge of tabletop 44. Then with probe 80 held at a position slightly below tabletop height, e.g. 0.25 inches below, a contact point P on the tabletop 44 is probed in the +X direction. A first position P1 and its x coordinate X1 (having a −X value) is recorded by controller 64. Next, probe 80 is withdrawn and moved in the +X direction to the other side of tabletop 44, as indicated by the dashed line and arrows, tabletop 44 is rotated 180° about table axis B. Probe 80 is also rotated 180° about the centerline of rotation C of spindle mechanism 10, to eliminate any error due to a possibly bent probe, and tabletop 44 is probed in the −X direction at the same contact point P at a second position P2 having a new X coordinate X2 (having +X value) and the same Y and Z coordinates as P1. If the absolute values of both X1 and X2 are equal then the home position in controller 64 is correct. If the there is a difference then an X displacement [offset] is calculated as being half the difference between the X1 and X2 values.

FIG. 7b illustrates a method by which the Z axis home position can be found using the apparatus and methodology of the present invention. First a contact point P is probed from the −X and +X direction, at two positions that are 180° apart and are in line with and on either side of table axis B, and in the same manner as illustrated in FIG. 7a. Having thus set the X home position by probing positions P1 and P2 as in FIG. 7a, a tabletop radius R from table axis B to position P1 is determined by dividing the difference of the X coordinates of positions P1 and P2 by 2, i.e. (X1-X2)/2). Then tabletop 44 and contact point P are rotated 90° about B axis from position P1 to position P3 and probe 80 is rotated 90 degrees to offset any bent probe effect. Then, with probe 80 mounted in spindle mechanism 10 at a trunnion angle a=−90°, contact point P on tabletop 44 is probed in the −Z direction at position P3 and should have a position a distance R from table axis B.

Figure 8:
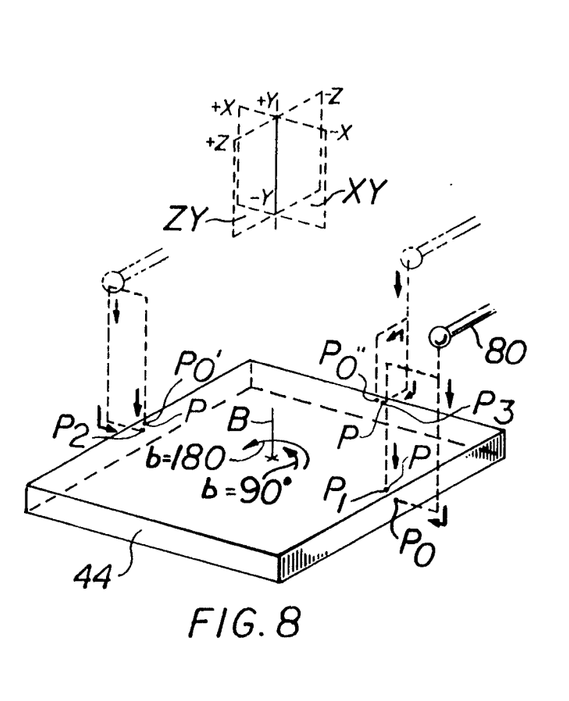
FIG. 8 is a perspective diagrammatic view illustrating a procedure for evaluating a tilt of a table B axis of a rotatable tabletop of CNC machine in FIG. 1.

One embodiment of the present invention is a technique to automatically evaluate the tilt of table axis B of rotatable tabletop 44 as illustrated in FIG. 8. Table axis B may have a tilt in a XY plane and in a ZY plane. Probe 80 is used to probe a contact point P on top surface 56 of tabletop 44 at two positions 180° apart in a first plane and at a third position 90°, in between the first two, in a second plane orthogonal to the first plane, passing through table axis B.

First, tabletop 44, with table axis B set at b=0°, is probed at point P0 on its −X facing edge with probe 80 mounted in spindle mechanism 10 at a trunnion angle a=0, and its X coordinate, X0, is recorded. Probe 80 then probes, in the −Y direction, a contact point P on surface 56 having a first position P1 which is at trunnion angle a=0 and at an X coordinate slightly inward from −X facing side of tabletop 44 having an X run in of about 0.25 inches (i.e. X1=X0−0.25"). This first path of probe 80 is indicated by a dashed line and used to measure and record the coordinates of position P1 at the time of the probe strike at P1 as X1, Y1 and Z1.

Next, probe 80 is withdrawn and moved to the other side of tabletop 44 which is rotated 180°. Tabletop 44 is probed in the −X direction to establish P0' and an X run in. Contact point P in the −Y direction is then probed at a second position P2 on surface 56 of tabletop 44 in the same manner as for P1, as shown by the dotted line, to determine Y2 at X2 and Z1. Note the Z coordinate does not change. The tabletop is then rotated 90° from its first position to move contact point P to a third position P3. Contact point P is then probed in the same manner as in positions P1 and P2 to determine a Y3 at X3 and Z3. The X3 axis position is (X2+X1)/2. The distance of the probe strike location from the B axis of rotation is (X2−X1)/2. The probe strike location is then rotated 90 degrees and the Z1 axis position is moved a distance that the probe strike location is from the B axis of rotation (X2−X1)/2 for the Z3 position. This procedure provides the data to calculate the tilt of table axis B in the ZY and YX planes. Tilt in the XY plane is equal to (Y2−Y1)/(X2−X1) and tilt in the ZY plane is equal to [Y3−(Y2+Y1)/2]/(Z3−Z1) .

Measurements are typically made in inches and tilt evaluations are conventionally displayed in taper per foot which is inches per foot. Therefore, [(Y2−Y1)/(X2−X1)]*12 is the taper per foot in the X direction and [(Y3−(Y2+Y1)/2)/(Z3−Z1)]*12 is the taper per foot in the Z direction, both of which are displayed on display 68 in FIG. 1. The present invention provides controller 64 with a computer program whereby based on the misalignment of table axis B of work table 44 a set of alignment instructions may be displayed on display 68. Alignment for table axis B is typically accomplished by adjusting z carrier spacers 60 as discussed above. By way of example, if B axis is off in both planes then 3 of the four z carrier spacers would have to be ground according to equations stored in controller 64. The screen would display instructions such as the following example.

0.0014" off Z axis carrier spacer #1
0.0008" off Z axis carrier spacer #3
0.0022" off Z axis carrier spacer #4

In addition the present invention contemplates the storage of certain cautions and other instructions which would be displayed at this point in the operation. An example of such a caution is as follows.

Be sure clamp plate is clean of nicks and dirt.
Reset Z carrier preload to 120 inch pounds.
Rerun for correction needed.

Such evaluations and alignments may be run several times a year. When a correction or alignment is carried out a confirming evaluation run should be made again which, because of the speed afforded by the present invention, enhances the reliability of the NC machine.

Figure 9:
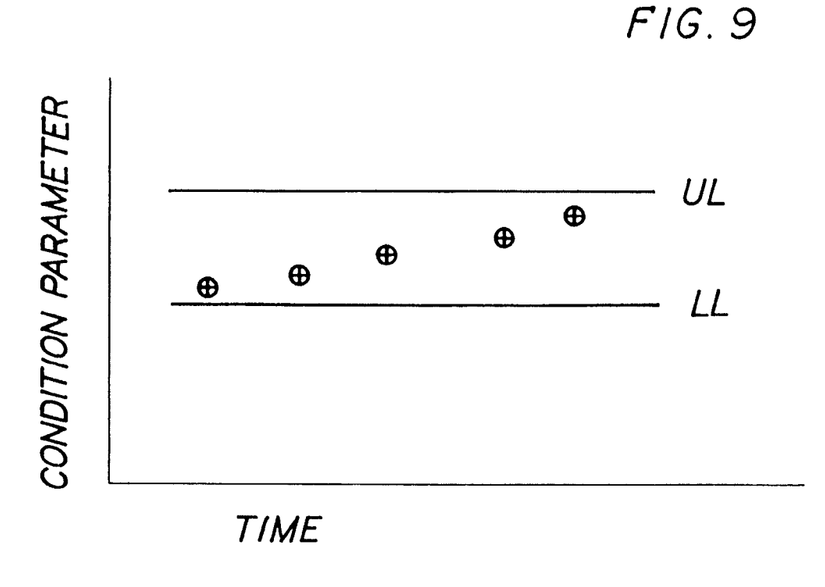
FIG. 9 is a graph illustrating a trend for a geometric condition of a machine component in FIG. 1.

Evaluations of an NC machine may not always require adjustments, corrections, or alignments and the present invention also provides for evaluations to be stored in controller 64 and passed on to a host digital numerical control (DNC) computer for statistical deterministic prediction maintenance techniques whereby a geometric condition of a machine component may be tracked between an upper limit UL and a lower limit LL as illustrated in the graph of FIG. 9. A trend may be shown between upper and lower limits so that maintenance may be performed before a machining error is made.

Further illustrations may be found in Appendix A of this application. Appendix A is an NC code listing illustrating various embodiments of the present invention and is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

While the embodiments of the present invention presented herein have been described fully in order to explain its principles, it is understood that various modifications or alterations may be made to the described embodiments without departing from the scope of the invention as set forth in the appended claims.

APPENDIX A

```
02245 RAPID,GODLTA/0,-.01,0
02250 TERMAZ
02255
02260 CHKOFF=MACRO/TOL
02265 INSERT/P36=',(CONVRT(TOL,1,3))
02270 INSERT/P37=',(CONVRT(TOL,1,3))
02275 INSERT P43=TBLVAL((P202),TLO) P68=123 P86=0
02280 INSERT (GSUB,OOT)
02285 TERMAC
02290
02295 REMARK *****************************
02300 REMARK *** READ/2,'$MACRO:CTT30.APT *** end ***
02305 REMARK *****************************
02310 MACHIN/MILACRON_T2
02315
02320 INTOL/.002
02325 OUTTOL/.002
02330 XVAL=20
02335 YVAL=0
02340 ZVAL=-49.5
02345 RESERV/TCD,5,SH,4
02350
02355 INSERT (DSP,2,1,WELCOME TO THE T30 MILL EVALUATION PROGRAM.)
02360 INSERT (DSP,4,9,* * * WARNING * * *)
02365 INSERT (DSP,6,1,THERE MUST BE NO FIXTURE OR PALLET ON THE MACHINE.)
02370 INSERT (DSP,7,1,TOOLING: SHORT PROBE ASSY NO. 9999 IN POCKET 1)
02375 INSERT (DSP,8,10,TVO GAGE PLUG ASSY NO. 9998 IN POCKET 2)
```

```
02380 INSERT (DSP,9,10,LONG PROBE ASSY NO. 9992 IN POCKET 3)
02385 INSERT (DSP,11,1,NOTE: YOU MUST ALWAYS RUN ITEM 1 BEFORE RUNNING ANY)
02390 INSERT (DSP,12,7,OTHER ITEM IN THIS PROGRAM.)
02395 INSERT (DSP,13,7,YOU MUST RUN ITEM 4 BEFORE RUNNING ITEM 6.)
02400 INSERT (DSP,14,7,YOU MUST RUN ITEM 5 BEFORE RUNNING ITEMS 6,7,8.)
02405 INSERT (DSP,18,1,PRESS CYCLE START FOR ITEM INFO.)
02410 INSERT M00
02415 INSERT (DSP,O)
02420 DELAY/2
02425 INSERT (DSP,2,4,* * ITEM INFORMATION * * *)
02430 INSERT (DSP,4,1,ITEM 1 WILL LOAD THE TVG GAGE PLUG, ASSY 9998)
02435 INSERT (DSP,5,9,AND CALIBRATE THE TVG.)
02440 INSERT (DSP,6,1,ITEM 2 WILL CHECK MACHINE A AXIS ERROR.)
02445 INSERT (DSP,7,1,ITEM 3 WILL CHECK A AXIS TRUNION CROSS OVER ERROR.)
02450 INSERT (DSP,8,1,ITEM 4 WILL LOAD THE LONG PROBE, ASSY 9992)
02455 INSERT (DSP,9,9,AND ESTABLISH CUBE TO SPINDLE CENTERLINE.)
02460 INSERT (DSP,10,1,ITEM 5 WILL LOAD THE SHORT PROBE, ASSY 9999)
02465 INSERT (DSP,11,9,AND CALIBRATE IT ON THE CUBE.)
02470 INSERT (DSP,12,1,ITEM 6 WILL CHECK SPINDLE PARLLEL TO Z & Y AXIS.)
02475 INSERT (DSP,13,1,ITEM 7 WILL CHECK MACHINE X & Z AXIS POSITION ERROR.)
02480 INSERT (DSP,14,1,ITEM 8 WILL CHECK B AXIS PERPENDICULAR TO XZ PLANE.)
02485 INSERT (DSP,16,1,PRESS CYCLE START TO BEGIN PROGRAM.)
02490 INSERT M00
02495 INSERT (DSP,0)
02500
02505 INSERT M242 M298
02510 INSERT P61=0 P35=0
02515
02520 TCD(01)='TVG CALIBRATION'
02520
02520 REMARK*******************************************
02520 A9998=MACRO/TL=2,SS=1000,TC=1,CO=9,VT=0,TG=0,VF=0,CC=0,$
02520        TR=0,W=0,DC=0,IT=0
02520
02520 ASY='12 INCH GAGE PLUG'
02520 ASSY=9998
02520 GL=12.000
02520 RD=(.9/2)
02520 CR=RD
02520 ML=0
02520 DT=.010
02520 DP=CR
02520 IF(TCGTO), CALL/TCT30,T=TL,S=SS,IT=IT,DCK=DC,TRC=TR,COL=CO,$
02520        VFY=VF,TVG=TG,VFT=VT,WASH=W,CRC=CC,TCC=TC
02520 TERMAC
02520 REMARK*******************************************
02520 .
02525 CALL/A9998,IT=01
02530 RAPID,GOTO/-17,10,36,0,0,1
02535 INSERT (DSP,4,6, ****** CLEAN THE GAGE PLUG *****)
02540 INSERT (DSP,16,1,PRESS CYCLE START TO CONTINUE)
02545 INSERT M00
02550 INSERT (DSP,0)
02555 RAPID,GOTO/15,10,36,0,0,1
02560 INSERT (GSUB,TVG)
02565
02570 INSERT N905 (MSG,ITEM 2 CHECK MACHINE A AXIS ERROR)
02575 QT=02,00
02580 ITD='CHECK MACHINE A AXIS ERROR'
02585 OUTPUT/6,ASSY,ASV,ITT,QT,ITD
02590
02595 INSERT E4
02600 INSERT A10 F100
02605 INSERT A0 F100
02610 RAPID,GOTO/15.5,-5,20.5,0,0,1
02615 GODLTA/0,.7,-6.50
02620 MODE/INCR
```

```
02625 INSERT G51 Y-1 F20 P1=20 P2=2 P4=.5
02630 DISPLY/GSUB,PSSTAT
02635 INSERT P10=PRBPSN(Y)
02640 GODLTA/-7.7,100
02645 INSERT G51 Y-1 F20 P1=20 P2=2 P4=.5
02650 DISPLY/GSUB,PSSTAT
02655 INSERT P11=PRBPSN(Y)
02660 INSERT Q180 M33
02665 GODLTA/0,-1.19,0,30
02670 DELAY/2
02675 INSERT G51 Y1 F20 P1=20 P2=2 P4=.5
02680 DISPLY/GSUB,PSSTAT
02685 INSERT P18=((P11+PRBPSN(Y))/2)
02690 GODLTA/7.7,100
02695 INSERT G51 Y1 F20 P1=20 P2=2 P4=.5
02700 DISPLY/GSUB,PSSTAT
02705 MODE/ABSPOS
02710 RAPID,GOTO/15.5,.5,25,0,0,1
02715 INSERT P13=((P10+PRBPSN(Y))/2)
02720 INSERT P43=((ATAND((P13-P18)/7.7))+(TBLVAL(4,FOV(A))))
02725
02730 RFD='TOTAL A AXIS ERROR'
02735 REF='M4A PY 4'
02740 CALL/CLM,MIN=-.1,MAX=.1
02745
02750 INSERT (DSP,4,1,TOTAL A AXIS ERROR : \(P43)11.8\)
02755 INSERT (DSP,15,1,BLOCK DELETE OFF & PRESS C/S TO RERUN THIS ITEM)
02760 INSERT (DSP,16,1,BLOCK DELETE ON & PRESS C/S TO CONTINUE TO NEXT ITEM)
02765 INSERT M00
02770 INSERT (DSP,0)
02775 INSERT/'(GOTO N905)'
02780
02785 INSERT N904 (MSG,ITEM 3 CHECK MACHINE CROSSOVER ERROR)
02790 QT=03.00
03115 INSERT (DSP,2,1,SPINDLE IS ABOVE A AXIS CENTERLINE BY \(P79)10.8\)
03120 INSERT (GOTO N901)
03125 INSERT N900 (DSP,2,1,SPINDLE IS BELOW A AXIS CENTERLINE BY \(P79)11.8\)
03130
03135 INSERT N901 (IF (P43<0) GOTO N902)
03140 INSERT (DSP,4,1,GRIND \(P43)10.8\ FROM SPINDLE FACE SPACER)
03145 INSERT (GOTO N903)
03150 INSERT N902 (DSP,4,1,ADD \(ABS(P43))10.8\ SHIM TO SPINDLE FACE SPACER)
03155
03160 INSERT N903 (DSP,7,4,********* C A U T I O N *************)
03165 INSERT (DSP,8,6,BEFORE WORKING ON MACHINE ...)
03170 INSERT (DSP,10,8,CHECK SPINDLE NOSE DETERIORATION.)
03175 INSERT (DSP,11,8,CHECK SPINDLE BEARING PRELOAD.)
03180 INSERT (DSP,12,8,CHECK 12.0" GAGE LENGTH OF TVG PLUG.)
03185 INSERT (DSP,15,1,BLOCK DELETE OFF & PRESS C/S TO RERUN THIS ITEM)
03190 INSERT (DSP,16,1,BLOCK DELETE ON & PRESS C/S TO CONTINUE TO NEXT ITEM)
03195 INSERT M00
03200 INSERT (DSP,0)
03205 INSERT/'(GOTO N904)'
03210
03215 INSERT P61=0
03220 TCD(04)='CUBE CENTERLINE USING LONG PROBE'
03220
03220 REMARK**************************************************
03220 A9992=MACRO/TL=1,SS=0,TC=1,CO=9,VT=0,TG=0,VF=0,CC=0,S
03220       TR=0,W=0,DC=0,IT=0
03220
03220 ASY='PART PROBE,LONG'
03220 ASSY=9992
03220 GL=19.62
03220 RD=(.0787/2)
03220 CR=RD
03220 ML=0
```

```
03220 DT=.010
03220 DP=CR
03220 IF(TC'GTO), CALL/TCT30,T=TL,S=SS,ITT=IT,DCK=DC,TRC=TR,COL=CO,S
03220        VFY=VF,TVG=TG,VFT=VT,WASH=W,CRC=CC,TCC=TC
03220 TERMAC
03220 REMARK***************************************************
03220
03225 CALL/A9992,IT=04,TL=3
03230
03235 VL=LINE/CANON,1,0,0,.11
03240 VR1=LINE/PARLEL,VL,XLARGE,.12
03245 VR2=LINE/PARLEL,VL,XLARGE,((.3937/2)+.34)
03250 VR3=LINE/PARLEL,VR1,XLARGE,1.5
03255 VR3A=LINE/PARLEL,VR3,XSMALL,.24
03260 VR4=LINE/PARLEL,VR2,XLARGE,1.5
03265 VL1=LINE/PARLEL,VL,XSMALL,.12
03270 VL2=LINE/PARLEL,VL,XSMALL,((.3937/2)+.34)
03275 VL3=LINE/PARLEL,VL1,XSMALL,1.5
03280 VL3A=LINE/PARLEL,VL3,XLARGE,.24
03285 VL4=LINE/PARLEL,VL2,XSMALL,1.5
03290
03295 HL=PLANE/CANON,0,1,0,.395
03300 HL1=PLANE/PARLEL,HL,YSMALL,.3
03305 HL2=PLANE/PARLEL,HL,YSMALL,.120
03310 HL3=PLANE/PARLEL,HL,YLARGE,.120
03315 HL4=PLANE/PARLEL,HL,YLARGE,((.3937/2)+.34)
03320
03325 PL=PLANE/CANNON,0,0,1,(22.329-.04)
03330 PL1=PLANE/PARLEL,PL,ZLARGE,(.3+.098+.04)
03335 PL2=PLANE/PARLEL,PL1,ZSMALL,1
03340 PL3=PLANE/PARLEL,PL,ZSMALL,1
04850 INSERT (STO,54,SOV(Z),0)
04855 INSERT G54 EO4 DO1
04860 RAPID,DNTCUT;GO/ON,VR2,ON,PL,ON,HL
04865 GODLTA/0,1.5;CUT
04870
04875 INSERT P43=(P77-P76)
04880 RFD='A AXIS SLICE ERROR'
04885 REF='MSE  PX 4'
04890 CALL/CLM,MIN=-.1,MAX=.1
04895
04900 INSERT P43=((P77-P79)*1.3683)
04905 RFD='SPINDLE TAPER/FT TO Z AXIS'
04910 REF='MSZ  PX 4'
04915 CALL/CLM,MIN=-.1,MAX=.1
04920 INSERT P71=(ABS((P77-P79)*3.1927))
04925 INSERT (DSP,4,1,TO CORRECT SPINDLE PARLEL Z ... GRIND \(P71)11.8\ FROM)
04930 INSERT (IF (P43)<0 GOTO N907)
04935 INSERT (DSP,5,1,Y AXIS CARRAGE FACE BEARING SPACERS NO. 1 & 2.)
04940 INSERT (GOTO N908)
04945 INSERT N907 (DSP,5,1,Y AXIS CARRAGE FACE BEARING SPACERS NO. 3 & 4.)
04950
04955 INSERT N908 P43=((P76-P78)*1.3683)
04960 RFD='SPINDLE TAPER/FT TO Y AXIS'
04965 REF='MSY  PX 4'
04970 CALL/CLM,MIN=-.1,MAX=.1
04975 INSERT P71=(ABS((P76-P78)*3.9908))
04980 INSERT (DSP,7,1,TO CORRECT SPINDLE PARLEL Y ... GRIND \(P71)11.8\ FROM)
04985 INSERT (IF (P43)<0 GOTO N909)
04990 INSERT (DSP,8,1,Y AXIS CARRAGE SIDE TOP BEARING SPACERS NO. 5.)
04995 INSERT (GOTO N910)
05000 INSERT N909 (DSP,8,1,Y AXIS CARRAGE SIDE BOTTOM BEARING SPACERS NO. 6.)
05005
05010 INSERT N910 (DSP,15,1,BLOCK DELETE OFF & PRESS C/S TO RERUN THIS ITEM)
05015 INSERT (DSP,16,1,BLOCK DELETE ON & PRESS C/S TO CONTINUE TO NEXT ITEM)
05020 INSERT M00
05025 INSERT (DSP,0)
```

```
05030 INSERT/'(GOTO N906)'
05035
05040 INSERT (MSG,ITEM 7 CHECK MACHINE X & Z POSITION.)
05045 QT=07.00
05050 ITD='CHECK MACHINE X & Z POSITION.'
05055 OUTPUT /6,ASY,TTT,QT,ITD
05060
05065 GL7=(GL-.04)
05070 TOOLNO/0,GL7
05075 INSERT (STO,1,FOV(X),0)
05080 INSERT (STO,1,FOV(Y),0)
05085 INSERT (STO,1,FOV(Z),0)
05090 INSERT (STO,1,FOV(B),0)
05095 RAPID,GOTO/0,15,20,0,0,1
05100 INSERT N911 GO B0
05105 RAPID,DNTCUT;GOTO/-(16.125+.5),-4.55,0,0,.866,.5
05110 GODLTA/4;CUT
05115 INSERT G53
05120 INSERT (GSUB,ROTOOL)
05125 INSERT (UPD,5,FOV(X),(TBLVAL(54,SOV(X))))
05130 INSERT (UPD,5,FOV(Z),(TBLVAL(54,SOV(Y))))
05135 XOFSET/5,NOW
05140 GODLTA/-4,51
05145 CALL/XDEV,P20=1
05150 INSERT P12=(ABS(P11))
05155 RAPID,GODLTA/4
05160 RAPID,DNTCUT;GOTO/(16.125+.5),-4,55,0,0,.866,.5
05165 GODLTA/4;CUT
05170    INSERT GO B180
05175    GODLTA/-4,50
05180    CALL/XDEV,P20=-1
05185    RAPID,GODLTA/4
05190    INSERT P43=((P11-P12)/2)
05195
05200    RFD='X AXIS MACHINE ERROR'
05205    REF='MEX PX 4'
05210    CALL/CLM,MIN=-.1,MAX=.1
05215
05220    INSERT (DSP,2,1,MACHINE X AXIS IS OFF BY \(P43)11.8\)
05225    INSERT P43=(((P12+P11)-P51)/2)
05230    RAPID,DNTCUT;GOTO/0,-4.55,(16.125+.5),0,.866,.5
05235    GODLTA/4;CUT
05240    INSERT GO B270
05245    GODLTA/-4,51
05250    CALL/ZDEV,P20=-1
05255    RAPID,GODLTA/4
05260    TOOLNO/0,GL
05265    INSERT P70=((P21+12.5-.04)*(COSD(60)))
05270    INSERT P43=((P70+P43+(P52/2))-(12.5+P11))
05275
05280    RFD='Z AXIS MACHINE ERROR'
05285    REF='MEZ PX 4'
05290    CALL/CLM,MIN=-.1,MAX=.1
05295
05300    INSERT (DSP,4,1,MACHINE Z AXIS IS OFF BY\(P43)11.8\)
05305    INSERT (DSP,15,1,BLOCK DELETE OFF & PRESS C/S TO
                RERUN THIS ITEM
05310    INSERT (DSP,16,1,BLOCK DELETE ON & PRESS C/S TO
                CONTINUE TO NEXT ITEM)
05315    INSERT M00
05320    INSERT (DSP,0)
05325    INSERT/'(GOTO N911)'
05330
05335    INSERT (MSG,ITEM 8 CHECK MACHINE B AXIS SQUARE TO XZ PLANE)
05340    QT=08.00
05345    ITD='CHECK MACHINE B AXIS SQUARE TO XZ PLANE'
05350    OUTPUT/6,ASSY,ASY,TTT,QT,ITD
```

```
05355
05360    INSERT (STO,1,FOV(X),0)
05365    INSERT (STO,1,FOV(Y),0)
05370    INSERT (STO,1,FOV(Z),0)
05375    INSERT (STO,1,FOV(B),0)
05380    RAPID,GOTO/0,15,20,0,0,1
05385    INSERT N912 GO 80
05390    RAPID,DNTCUT;GOTO/-11.5,-3.9,0,0,.866,.5
05395    GODLTA/4;CUT
05400    INSERT G53
05405    INSERT (GSUB,ROTOOL)
05410    INSERT (UPD,5,FOV(X),(TBLVAL(54,SOV(X))))
05415    INSERT (UPD,T,FOV(Z),(TBLVAL(54,SOV(Y))))
05420    XOFSET/5,NOW
05425    GODLTA/-4,52
05430    CALL/YDEV,P20=-1
05435    INSERT P12=P11
05440    RAPID,GODLTA/4
05445    RAPID,DNTCUT;GOTO/0,-3.9,-11.5,0,.866,.5
05450    GODLTA/4;CUT
05455    INSERT GO 890
05460    GODLTA/-4,51
05465    CALL/YDEV,P20=-1
05470    INSERT P13=P11
05475    RAPD,GODLTA/4
05480    RAPID,DNTCUT;GOTO/11.5,-3.9,0,0,.866,.5
05485    GODLTA/4;CUT
05490    INSERT GO 3180
05495    GODLTA/-4,50
05500    CALL/YDEV,P20=-1
05505    INSERT P14=P11
05510    RAPID,GODLTA/4
05515    RAPID,DNTCUT;GOTO/0,-3.9,11.5,0,.866,.5
05520    GODLTA/4;CUT
05525    INSERT GO B270
05530    GODLTA/-4,51
05535    CALL/YDEV,P20=-1
05540    RAPID,GODLTA/4
05545
05550    INSERT P43=P11
05555    RFD='Y AXIS MACHINE POSITION'
05560    REF='MPY  PX 4'
05565    CALL/CLM,MIN=15.5,MAX=16.5
05570
05575    INSERT P43=((P12-P14)/1.9166)
05580    RFD='B AXIS TAPER/FOOT IN X DIRECTION'
05585    REF='MBX  PX 4'
05590    CALL/CLM,MIN=-.1,MAX=.1
05595    INSERT (DSP,2,1,B AXIS TAPER/FOOT IN X
              DIRECTION... \(P43)11.8\)
05600
05605    INSERT P43=((P13-P11)/1.9166)
05610    RFD='B AXIS TAPER/FOOT IN Z DIRECTION'
05615    REF='MBZ  PX 4'
05620    CALL/CLM,MIN=-.1,MAX=.1
05625    INSERT (DSP,3,1,B AXIS TAPER/FOOT IN Z
              DIRECTION... \(P43)11.8\)
05630
05635    INSERT P70=((P12-P14)*1.3478) P71=((P13-P11)*1.7826)
05640    INSERT GO4 X1
05645    INSERT (IF(P70>0) GOTO N999)
05650    INSERT (IF(P71>0) GOTO N997)
05655    INSERT P72=2 P73=3 P74=1)
05660    INSERT (GOTO N996)
05665    INSERT N997 P72=1 P73=4 P74=2
05670    INSERT (GOTO N996)
05675    INSERT N999 (IF(P71>0) GOTO N998)
```

```
05680   INSERT P72=3 P73=2 P74=4
05685   INSERT (GOTO N996)
05690   INSERT N998 P72=4 P73=1 P74=3
05695   INSERT N996 G04 X1
05700
05705   INSERT (DSP,5,1,TO CORRECT B AXIS LEAN.)
01710   INSERT (DSP,7,1,GRIND\((ABS(P70))+
            (ABS(P71))\11.8\FROM Z AXIS )
05715   INSERT (DSP,7,31,CARRIER BEARING SPACER NO. \(P72)2.0\)
05720   INSERT (DSP,9,1,GRIND\(ABS(P71))\11.8 FROM Z AXIS )
05725   INSERT (DSP,9,31,CARRIER BEARING SPACER NO.\(P73)2.0\)
05730   INSERT (DSP,11,1,GRIND \(ABS(P70))\11.8\ FROM Z AXIS )
05735   INSERT (DSP,11,31,CARRIER BEARING SPACER NO.\(P74)2.0\)
05740   INSERT (DSP,15,1,BLOCK DELETE OFF & PRESS C/S TO RERUN THIS ITEM)
05745   INSERT (DSP,16,1,BLOCK DELETE ON & PRESS C/S TO COMPLETE PROGRAM)
05750   INSERT M00
05755   INSERT (DSP,0)
05760   INSERT /'(GOTO N912)'
05765
05770   INSERT M30
05775   INSERT (END_PROG)
05780   FINI
```

We claim:

1. An alignment system for a computer numerically controlled (CNC) machine having movable machine components, said alignment system comprising:
    a spindle having a spindle mounted tool holding means;
    a probe to measure relative positions of the machine components, said probe being mountable in said tool holding means;
    control means for moving said spindle mounted probe to probe at least two different positions of a movable machine component;
    computing means for using said at least two different positions to evaluate a geometric condition of the machine component with respect to at least one degree of freedom of motion of said machine component; and
    means for providing alignment instructions for an operator to follow to align the machine component in response to the geometric condition of the machine component, the geometric condition being an angular misalignment of the machine component requiring human adjustments to properly realign the machine component.

2. The alignment system of claim 1, wherein said computing means further comprises means for calculating an amount of misalignment of said machine component with respect to said at least one degree of freedom of motion of said machine component.

3. The alignment system of claim 2, wherein said computing means further comprises:
    means for storing a schedule of alignment instructions as a function of machine component misalignment measurements; and
    means for determining and issuing alignment instructions in response to the amount of misalignment calculated.

4. The alignment system of claim 3, further comprising a display screen associated with the CNC machine for displaying said alignment instructions.

5. The alignment system of claim 1, wherein said computing means further comprises:
    means for storing a schedule of alignment instructions as a function of a parameter related to said machine component degree of freedom of motion for aligning said machine component; and
    means for comparing said evaluated geometric condition against said schedule.

6. The alignment system of claim 1, further comprising means for tracking the geometric condition of the machine component over a series of different evaluations.

7. The alignment system of claim 1, wherein said alignment instructions comprise instructions for adjusting a set of spacers associated with the machine component.

8. A method for aligning a computer numerically controlled (CNC) machine having movable machine components, the method comprising the steps of:
    directing a spindle mounted probe to measure at least two different positions of a movable machine component relative to a degree of freedom of motion of the machine component;
    using the at least two measured positions to evaluate a geometric condition of the machine component relative to said degree of freedom of motion of the machine component; and
    providing alignment instructions for an operator to follow to align the machine component in response to the geometric condition of the machine component, the geometric condition being an angular misalignment of the machine component requiring human adjustments to properly realign the machine component.

9. The method of claim 8, further comprising the step of calculating an amount of misalignment of the machine component from said geometric condition of the machine component with respect to said degree of freedom of motion of the machine component.

10. The method of claim 9, further comprising the steps of:
    providing a schedule of alignment instructions as a function of machine component misalignment measurements; and
    selecting and issuing alignment instructions in response to the geometric condition of the machine component.

11. The method of claim 8, further comprising the step of tracking the geometric condition of the machine component over a series of different evaluations.

12. The alignment system of claim 8, wherein said alignment instructions comprise instructions for adjusting a set of spacers associated with the machine component.

* * * * *